UNITED STATES PATENT OFFICE 2,367,544

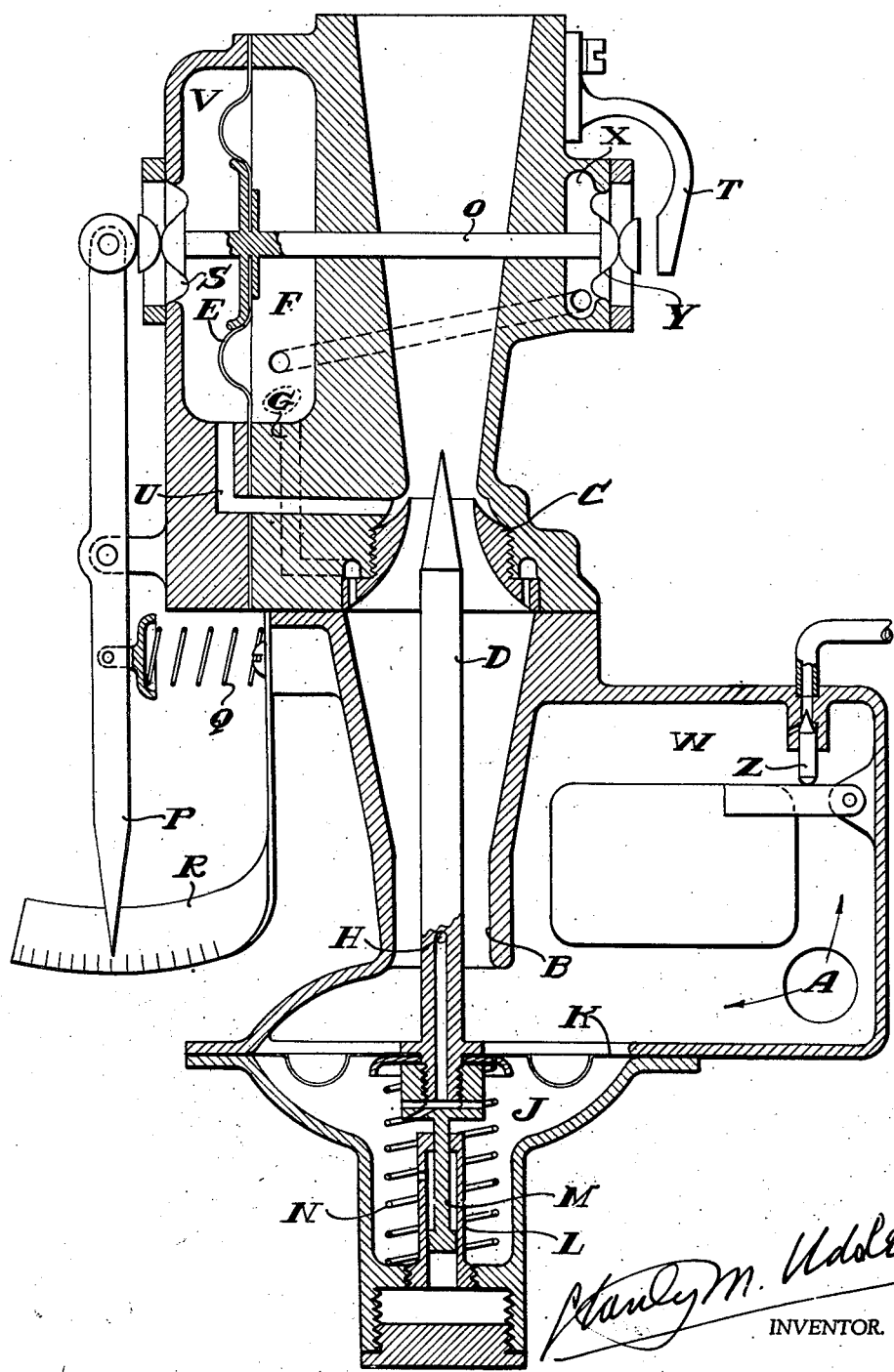

FLOWMETER

Stanley M. Udale, Detroit, Mich., assignor to George M. Holley and Earl Holley

Application November 22, 1943, Serial No. 511,376

1 Claim. (Cl. 73—207)

The object of this invention is to enable a flowmeter which is adapted to read relatively large fuel flows to also read fuel flows of relatively small value and to read these with greater accuracy than the larger flows.

With an ordinary flowmeter, the readings become progressively greater as the flow increases. The result is that when making the readings for maximum flows the gauge is more accurate than when reading at low flows, but obviously, fuel economy is of more interest at low fuel flows than it is at maximum flows.

The result is that the ordinary flowmeter gives accurate readings for high fuel flows and gives relatively inaccurate readings at low flows when an accurate reading is of greater importance. I have discovered that if a needle is inserted in the venturi which is made larger than desirable for the minimum flows, the readings at low flows are made as accurately as possible and then when a critical flow is exceeded, if the venturi is automatically made larger by withdrawing the needle, then relatively large flows can be read without excessively large movement of the indicating means.

The drawing shows diagrammatically the elements of my invention. The fuel flows into the vapor separator W provided with the usual float and needle valve Z for the escape of vapor. The fuel then flows through a restricted annular passage B and then flows through the variable venturi C. In the center of both passage B and venturi C is a rod D. That portion of the rod D located in the passage B is cylindrical, the tapered portion of the rod D being in the throat of the venturi C. The pressure difference created in the annular passage B is transmitted through the orifice H to a chamber J below a diaphragm K. The diaphragm K is thus drawn down compressing the spring N. The needle D is guided by means of the element L which also acts as a stop in both directions. The projection M on the end of the needle D being guided in the element L limits the upward movement of the diaphragm K and also limits the depression of the diaphragm K. Pressure differences created in the venturi C are transmitted through the passage U to the chamber V and through the passage G to the chamber F. The diaphragm E which separates the chambers V and F is connected to a rod O. In order that there should be no packing around the shaft O, similar balanced diaphragms S and Y are provided. The chamber X to the left of the diaphragm R is connected through a passage to the chamber F. A stop T limits the movement of the rod O to the right. The rod O, as it moves to the left, engages with a lever P which compresses a spring Q. The lower end of the lever P indicates on a dial R the quantity of fuel flowing through the venturi C.

Any leakage of fuel along the shaft O will not influence the accuracy of the readings appreciably.

Operation

In the operation of the device, fuel enters at A and flows through the passage B, passing through the vapor separator W located between the entrance A and the passage B. The fuel next flows to the venturi C in which slides the needle D. A depression set up in the throat of the venturi C is transmitted to the chamber V located above the chamber F and the chamber F communicates with the pressure of the fuel at the entrance of the venturi C through the passage G. The opening H in the rod D in the passage B communicates the pressure in the passage B to the chamber J which is separated from the fuel entrance A by the diaphragm K. A stop L and a guided projection M determine the travel of the diaphragm K in both directions. The diaphragm K is supported by the spring N so that the diaphragm K responds to the influence of the flow through the passage B and initially the diaphragm K and the needle D are in a position which restricts the throat of the venturi C so that the venturi C gives a reading at relatively low fuel flows. These readings are determined by the difference of pressure in the two chambers V and F and by the strength of the spring Q.

In the position shown, which corresponds to the position for relatively high fuel flows, the area of the venturi C is almost at its maximum; hence the effect of the fuel flow through the venturi C is at a minimum. Thus the readings for the maximum flow are not excessively great as they would be if a fixed venturi was used. The ideal arrangement is that all the scale divisions on the scale R have an equal value in pounds per hour, but this is not necessary.

Until a minimum fuel flow is exceeded, the needle D remains in its upper position from which it is not moved until the fuel flow exceeds a predetermined minimum flow.

What I claim is:

In a flowmeter, a restricted fuel passage of constant area, a metering venturi connected thereto, a tapered needle located in the throat of said metering venturi, means responsive to the drop of pressure in the fuel passage for moving the needle in said metering venturi, means responsive to the pressure drop in the throat of the metering venturi for indicating fuel flow.

STANLEY M. UDALE.